(12) United States Patent
Lim

(10) Patent No.: US 12,177,579 B2
(45) Date of Patent: Dec. 24, 2024

(54) IMAGE SENSOR MECHANISM FOR PRE-PROCESSING ANALOG PIXEL DATA OF PIXEL ARRAY TO REDUCE DESIGN COMPLEXITY AND SAVE POWER CONSUMPTION FOR DIGITAL PROCESSING CIRCUIT

(71) Applicant: PixArt Imaging Inc., Hsin-Chu (TW)

(72) Inventor: Wooi Kip Lim, Penang (MY)

(73) Assignee: PixArt Imaging Inc., Hsin-Chu (TW)

( * ) Notice: Subject to any disclaimer, the term of this patent is extended or adjusted under 35 U.S.C. 154(b) by 76 days.

(21) Appl. No.: 18/091,399

(22) Filed: Dec. 30, 2022

(65) Prior Publication Data

US 2024/0223914 A1   Jul. 4, 2024

(51) Int. Cl.
*H04N 23/80* (2023.01)
*H04N 25/46* (2023.01)
*H04N 25/771* (2023.01)
*H04N 25/78* (2023.01)

(52) U.S. Cl.
CPC .......... *H04N 23/80* (2023.01); *H04N 25/46* (2023.01); *H04N 25/771* (2023.01); *H04N 25/78* (2023.01)

(58) Field of Classification Search
CPC ...... H04N 23/80; H04N 25/46; H04N 25/771; H04N 25/78; H04N 25/40; H04N 25/70; H04N 25/76; H04N 25/77
See application file for complete search history.

(56) References Cited

U.S. PATENT DOCUMENTS

| | | | | |
|---|---|---|---|---|
| 11,537,201 B1* | 12/2022 | Puttaswamy | ............. | G06T 5/20 |
| 2005/0103977 A1* | 5/2005 | Krymski | ................ | H04N 25/46 |
| | | | | 348/E3.02 |
| 2010/0053356 A1* | 3/2010 | Tsunekawa | ............ | H04N 25/46 |
| | | | | 348/222.1 |
| 2021/0151485 A1* | 5/2021 | Ma | .................... | H01L 27/14831 |
| 2021/0152759 A1* | 5/2021 | Dharia | ................... | H04N 25/42 |

* cited by examiner

*Primary Examiner* — Albert H Cutler
(74) *Attorney, Agent, or Firm* — Winston Hsu

(57) ABSTRACT

A method of an image sensor device includes: providing a pixel array having a plurality of pixel units; using a pixel pre-processing circuit for receiving a plurality of analog pixel signals respectively from the plurality of pixel units to perform a low-pass filter operation upon the plurality of analog pixel signals in analog domain to generate a plurality of analog processed signals, a number of the plurality of analog processed signals being smaller than a number of the plurality of analog pixel signals; using an analog-to-digital converter for converting the plurality of analog processed signals in the analog domain into a plurality of digital processed signals in digital domain; and, transmitting the plurality of digital processed signals in digital domain into a digital processing circuit coupled to the analog-to-digital converter.

14 Claims, 7 Drawing Sheets

IMAGE SENSOR MECHANISM FOR PRE-PROCESSING ANALOG PIXEL DATA OF PIXEL ARRAY TO REDUCE DESIGN COMPLEXITY AND SAVE POWER CONSUMPTION FOR DIGITAL PROCESSING CIRCUIT

BACKGROUND OF THE INVENTION

1. Field of the Invention

The invention relates to an image sensor mechanism, and more particularly to an image sensor device and a corresponding method.

2. Description of the Prior Art

Generally speaking, a conventional image sensor scheme employs an analog-to-digital converter to directly convert analog pixel data (i.e. pixel signals from a pixel array of a conventional sensor) into digital pixel data and then employs a digital processing solution to process or handle the digital pixel data. However, this inevitably consumes more power and introduces complexity when processing the digital pixel data having a large bit size.

SUMMARY OF THE INVENTION

Therefore one of the objectives of the invention is to provide an image sensor device and a corresponding method, to solve the above-mentioned problems.

According to embodiments of the invention, an image sensor device is disclosed. The image sensor device comprises a pixel array, a pixel pre-processing circuit, and an analog-to-digital converter. The pixel array has a plurality of pixel units. The pixel pre-processing circuit is coupled to the pixel array, and is used for receiving a plurality of analog pixel signals respectively from the plurality of pixel units to perform a low-pass filter operation upon the plurality of analog pixel signals in analog domain to generate a plurality of analog processed signals. A number of the plurality of analog processed signals is smaller than a number of the plurality of analog pixel signals. The analog-to-digital converter is coupled to the pixel pre-processing circuit, and is used for converting the plurality of analog processed signals in the analog domain into a plurality of digital processed signals in digital domain, and for transmitting the plurality of digital processed signals in digital domain into a digital processing circuit coupled to the analog-to-digital converter.

According to the embodiments, a method of an image sensor device is disclosed. The method comprises: providing a pixel array having a plurality of pixel units; using a pixel pre-processing circuit for receiving a plurality of analog pixel signals respectively from the plurality of pixel units to perform a low-pass filter operation upon the plurality of analog pixel signals in analog domain to generate a plurality of analog processed signals, a number of the plurality of analog processed signals being smaller than a number of the plurality of analog pixel signals; using an analog-to-digital converter for converting the plurality of analog processed signals in the analog domain into a plurality of digital processed signals in digital domain; and, transmitting the plurality of digital processed signals in digital domain into a digital processing circuit coupled to the analog-to-digital converter.

These and other objectives of the present invention will no doubt become obvious to those of ordinary skill in the art after reading the following detailed description of the preferred embodiment that is illustrated in the various figures and drawings.

DETAILED DESCRIPTION

The invention aims at providing a technical solution of a pixel pre-processing mechanism capable of simplifying a digital filter processing operation (e.g. low-pass filter operation) to replace a portion of processing operation in a digital-core processor (e.g. a digital processing circuit) by pre-processing pixel data before the pixel data is transmitted into one or more digital-core circuit (s). This mechanism or design can save the digital power, i.e. the power provided for the one or more digital-core circuit (s), as well as reduce the design complexity of the digital circuit (s). This can also improve signal-to-noise ratio (SNR) of image signals such as pixel images.

Figure 1:
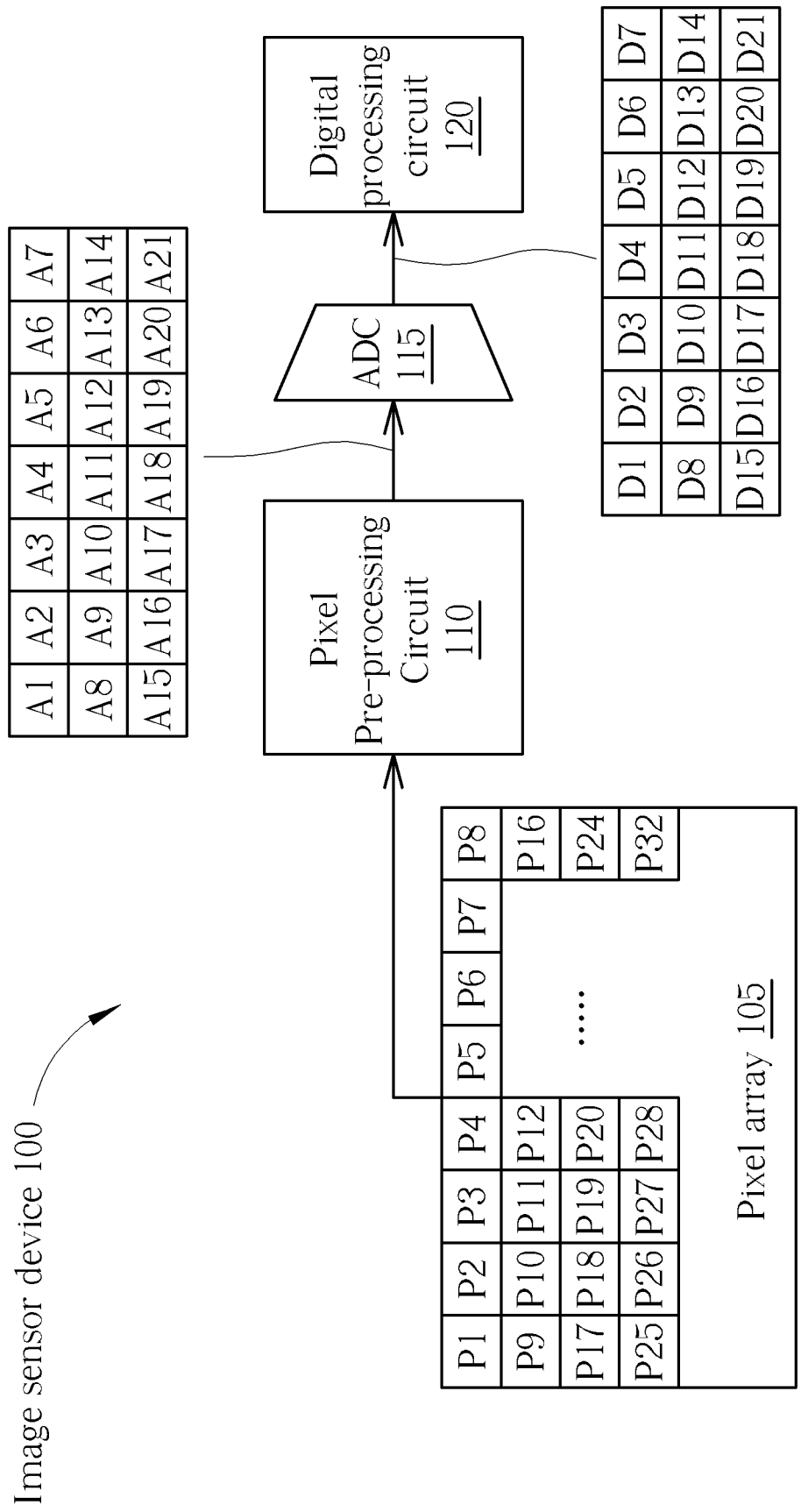
FIG. 1 is a diagram of an image sensor device according to an embodiment of the invention.

FIG. 1 is a diagram of an image sensor device 100 according to an embodiment of the invention. The image sensor device 100 comprises a pixel array 105, a pixel pre-processing circuit 110, an analog-to-digital converter (ADC) 115, and a digital processing circuit 120. The pixel data is pre-processed before being transmitted into and converted by the ADC 115.

The pixel array 105 has a plurality of pixel units such as N×M pixel units arranged in N rows and M columns, e.g. such as 32 pixel units arranged in four rows and eight columns as shown in FIG. 1 and used to respectively generate a plurality of analog pixel signals P1-P32 in FIG. 1. The total number N×M, row number N, and column number M of the pixel units are meant to be limitations. In other embodiments, the total number N×M, row number N, and column number M can be different. The pixel array 105 is arranged to output and transmit the pixel data, i.e. the analog pixel signals P1-P32, to the pixel pre-processing circuit 110. The pixel data transmission may be performed serially or in parallel.

The pixel pre-processing circuit 110 is disposed and coupled between the pixel array 105 and ADC 115, and it is used for receiving the analog pixel signals P1-P32, performing low-pass filter operation (s) upon the analog pixel signals P1-P32 in analog domain to generate a plurality of analog processed signals A1-A21, wherein the number of analog processed signals A1-A21 is smaller than the number of analog pixel signals P1-P32. For example, the number of analog processed signals A1-A21 is equal to (N−1)×(M−1) such as 3×7=21, which is smaller than the number N×M of the analog pixel signals, i.e. 4×8=32.

Further, in one embodiment, the number of analog processed signals A1-A21 may be generated or calculated by performing weighted averaging operations upon different portions of the analog pixel signals. For example, every K analog pixel signals in the number N×M of the analog pixel signals can be used to generate or calculate one analog processed signal, and the value K can be equal to or more than two. Further, in one embodiment, at least a group of K analog pixel signals, used for generating a first analog processed signal, may partially overlap with another different group of K analog pixel signals used for generating a second analog processed signal. The modifications also fall within the scope of the invention.

The ADC 115 is disposed and coupled between the pixel pre-processing circuit 110 and the digital processing circuit 120, and it is used for converting the analog processed signals A1-A21 in the analog domain into a plurality of digital processed signals D1-D21 in digital domain, and is used for transmitting the digital processed signals D1-D21 in digital domain into the digital processing circuit 120; the digital processing circuit 120 can perform corresponding digital processing operation (s) upon the digital processed signals D1-D21, and the operations of the digital processing circuit 120 are not detailed for brevity.

In the embodiments, an analog processed signal is generated by the low-pass filter operation of the pre-processing circuit 110 in the analog domain based on neighboring/adjacent analog pixel signals. For example, the neighboring/adjacent analog pixel signals may be analog pixel signals of neighboring pixel units arranged in Q rows and R columns, wherein Q is an integer smaller than N and R is an integer smaller than M. For example, the value Q is equal to 2 and the value R is equal to 2, i.e. 2×2 neighboring pixel units.

For example (but not limited), the analog processed signals A1-A21 are equivalently arranged in three rows and seven columns. For a specific analog processed signal at a specific row and at a specific column, the specific analog processed signal is generated by performing a low-pass filter operation in analog domain based on four neighboring pixel signals such as pixel signals of four pixel units, e.g. a pixel unit at the specific row and the specific column, an adjacent pixel unit at the specific row and at a next column, an adjacent pixel unit at a next row and at the specific column, and an adjacent pixel unit at the next row and at the next column.

For example, for the analog processed signal A1 at the first row and first column, the analog processed signal A1 is generated by performing the low-pass filter operation in the analog domain based on neighboring analog pixel signals such as four neighboring pixel signals P1, P2, P9, and P10, wherein the pixel signal P1 is at an analog pixel signal at the first row and first column generated by the pixel array 105. For the analog processed signal A2 at the first row and second column, the analog processed signal A2 is generated by the low-pass filter operation in the analog domain based on four neighboring pixel signals P2, P3, P10, and P11, wherein the pixel signal P2 is at an analog pixel signal at the first row and second column generated by the pixel array 105. For the analog processed signal A3 at the first row and third column, the analog processed signal A3 is generated by the low-pass filter operation in the analog domain based on four neighboring pixel signals P3, P4, P11, and P12, wherein the pixel signal P3 is at an analog pixel signal at the first row and third column generated by the pixel array 105. Similarly, for the analog processed signal A7 at the first row and seventh column, the analog processed signal A7 is generated by the low-pass filter operation in the analog domain based on four neighboring pixel signals P7, P8, P15, and P16, wherein the pixel signal P7 is at an analog pixel signal at the first row and seventh column generated by the pixel array 105.

For the analog processed signal A8 at the second row and first column, the analog processed signal A8 is generated by the low-pass filter operation in the analog domain based on neighboring analog pixel signals such as four neighboring pixel signals P9, P10, P17, and P18, wherein the pixel signal P9 is at an analog pixel signal at the second row and first column generated by the pixel array 105. For the analog processed signal A9 at the second row and second column, the analog processed signal A9 is generated by the low-pass filter operation in the analog domain based on four neighboring pixel signals P10, P11, P18, and P19, wherein the pixel signal P10 is at an analog pixel signal at the second row and second column generated by the pixel array 105. For the analog processed signal A10 at the second row and third column, the analog processed signal A10 is generated by the low-pass filter operation in the analog domain based on four neighboring pixel signals P11, P12, P19, and P20, wherein the pixel signal P11 is at an analog pixel signal at the second row and third column generated by the pixel array 105. Similarly, for the analog processed signal A14 at the second row and seventh column, the analog processed signal A14 is generated by the low-pass filter operation in the analog domain based on four neighboring pixel signals P15, P16, P23, and P24, wherein the pixel signal P15 is at an analog pixel signal at the second row and seventh column generated by the pixel array 105.

For the analog processed signal A15 at the third row and first column, the analog processed signal A15 is generated by the low-pass filter operation in the analog domain based on neighboring analog pixel signals such as four neighboring pixel signals P17, P18, P25, and P26, wherein the pixel signal P17 is at an analog pixel signal at the third row and first column generated by the pixel array 105. For the analog processed signal A16 at the third row and second column, the analog processed signal A16 is generated by the low-pass filter operation in the analog domain based on four neighboring pixel signals P18, P19, P26, and P27, wherein the pixel signal P18 is at an analog pixel signal at the third row and second column generated by the pixel array 105. For the analog processed signal A17 at the third row and third column, the analog processed signal A17 is generated by the low-pass filter operation in the analog domain based on four neighboring pixel signals P19, P20, P27, and P28, wherein the pixel signal P19 is at an analog pixel signal at the third row and third column generated by the pixel array 105. Similarly, for the analog processed signal A21 at the third row and seventh column, the analog processed signal A21 is generated by the low-pass filter operation in the analog domain based on four neighboring pixel signals P23, P24, P31, and P32, wherein the pixel signal P23 is at an analog pixel signal at the third row and seventh column generated by the pixel array 105.

The pixel pre-processing circuit 110 is arranged to perform the low-pass filter operation upon four adjacent pixel signals to generate a corresponding analog processed signal which is then processed and converted by the ADC 115 into a corresponding digital processed signal that is to be inputted to the digital processing circuit 120. In practice, for generating a corresponding analog processed signal, the pixel pre-processing circuit 110 may employ four capacitors to respectively store the four adjacent pixel signals and then to make terminals of the four capacitors be coupled together to generate a resultant signal that is equivalent to a signal generated by the low-pass filter operation upon the four adjacent pixel signals.

In one embodiment, the pixel pre-processing circuit 110 may employ N×M capacitor banks to respectively receive and store N×M analog pixel signals, to respectively perform low-pass filter operations upon corresponding Q×R analog neighboring pixel signals to respectively generate Q×R analog processed signals into the ADC 115. One capacitor bank comprises a plurality of capacitors, and each capacitor in one capacitor bank is arranged to receive and store the same pixel signal from the same pixel unit.

Figure 2:
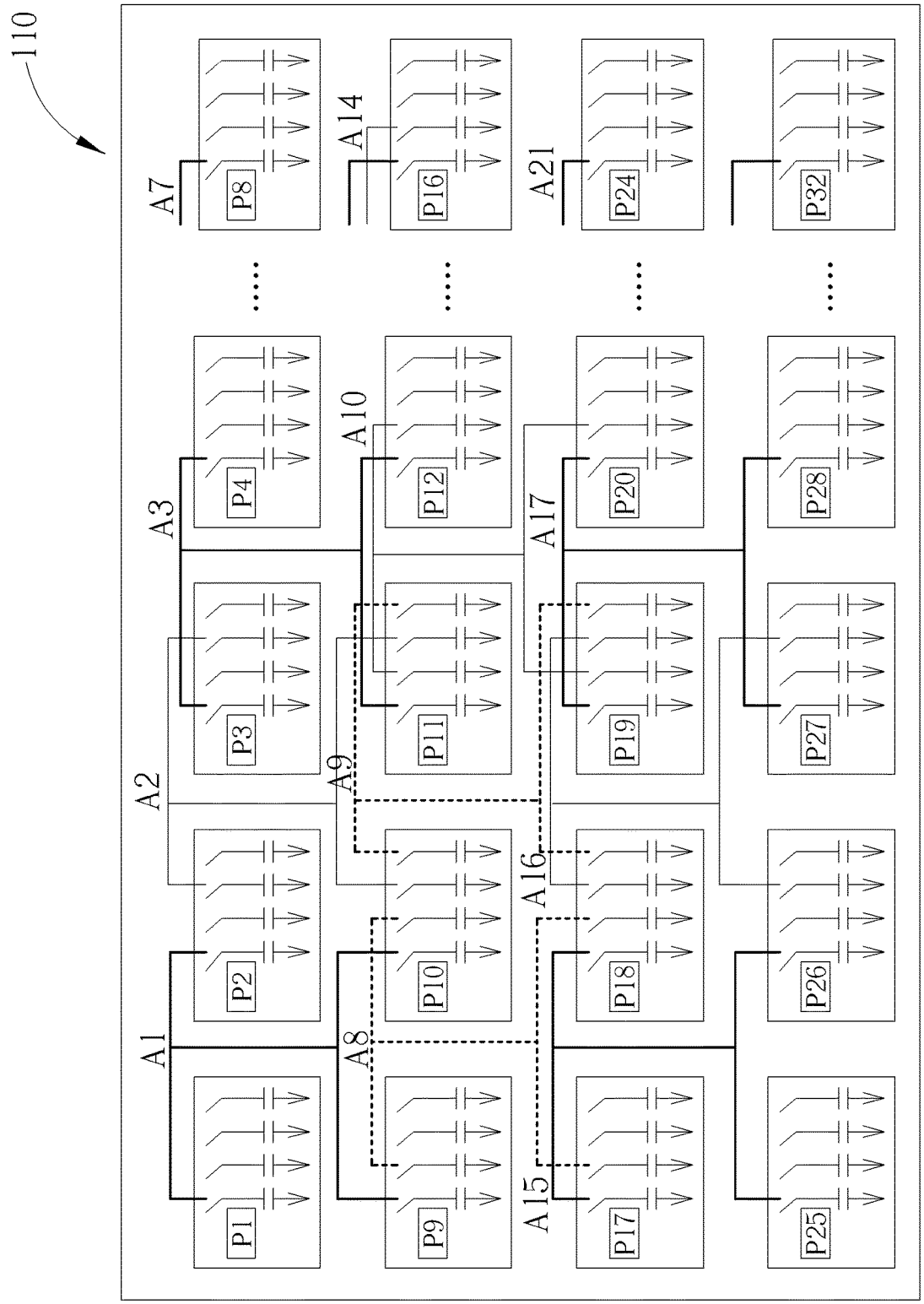
FIG. 2 is a circuit diagram of the pixel pre-processing circuit in FIG. 1 according to an embodiment of the invention.

FIG. 2 is a circuit diagram of the pixel pre-processing circuit 110 in FIG. 1 according to an embodiment of the invention. The pixel pre-processing circuit 110 comprises a plurality of capacitor banks arranged in N rows and M columns, wherein the value N is four and the value M is eight, i.e. 4×8=32 capacitor banks, and the 32 capacitor banks are respectively used for receiving and storing the plurality of analog pixel signals P1-P32 respectively from the 32 pixel units of FIG. 1.

A capacitor bank comprises a plurality of capacitors and a plurality of first switches, wherein a corresponding capacitor and a corresponding first switch are connected in series. A capacitor is disposed and coupled between a corresponding first switch and a ground level. Alternatively, in one embodiment, a corresponding first switch may be disposed and selectively coupled between a capacitor and the ground level. The number of capacitors (or the number of first switches) in one capacitor bank is equal to 1×4=4; however, this is not intended to be a limitation. That is, a capacitor bank comprises four capacitors and four first switches, and the four capacitors with four first switches are arranged in one row and four sub-columns, i.e. 1×4 capacitors with corresponding 1×4 first switches. The 1×4 capacitors in one capacitor bank are equivalently disposed in different spatial positions, i.e. first, second, third, and fourth positions (i.e. four sub-columns of one column) in such capacitor bank.

To generate an analog processed signal, the pixel pre-processing circuit 110 can select corresponding capacitors respectively disposed in the same spatial positions within corresponding capacitor banks, control and conduct the corresponding first switches corresponding to the selected capacitors so as to perform the low-pass filter operation upon the analog pixel signals stored in the selected capacitors to process and generate such analog processed signal. The pixel pre-processing circuit 110 may sequentially select and determine capacitors associated with the analog processed signals to be generated, from top to bottom and from left to right.

For example, at the first, as shown in FIG. 2, for generating the analog processed signals A1, A8, and A15 in the first column in the (M−1) columns (M is eight), the pixel pre-processing circuit 110 may select and determine four capacitors, respectively disposed at the first spatial positions (first sub-column positions) within four neighboring capacitor banks, to generate the analog processed signal A1. The pixel pre-processing circuit 110 may select and determine four capacitors, respectively disposed at the second spatial positions (second sub-column positions) within four neighboring capacitor banks, to generate the analog processed signal A8. The pixel pre-processing circuit 110 may select and determine four capacitors, respectively disposed at the first spatial positions (first sub-column positions) within four neighboring capacitor banks, to generate the analog processed signal A15.

Then, for generating the analog processed signals A2, A9, and A16 in the second column, the pixel pre-processing circuit 110 may select and determine four capacitors, respectively disposed at the third spatial positions (third sub-column positions) within four neighboring capacitor banks, to generate the analog processed signal A2, so as to avoid using repeated capacitor (s). Then, the pixel pre-processing circuit 110 may select and determine four capacitors, respectively disposed at the fourth spatial positions (fourth sub-column positions) within four neighboring capacitor banks, to generate the analog processed signal A9. The pixel pre-processing circuit 110 may select and determine four capacitors, respectively disposed at the third spatial positions (third sub-column positions) within four neighboring capacitor banks, to generate the analog processed signal A16.

Then, for generating the analog processed signals A3, A10, and A17 in the third column, the pixel pre-processing circuit 110 may select and determine four capacitors, respectively disposed at the first spatial positions (first sub-column positions) within four neighboring capacitor banks, to generate the analog processed signal A3, so as to avoid using repeated capacitor (s). The pixel pre-processing circuit 110 may select and determine four capacitors, respectively disposed at the second spatial positions (second sub-column positions) within four neighboring capacitor banks, to generate the analog processed signal A10. The pixel pre-processing circuit 110 may select and determine four capacitors, respectively disposed at the first spatial positions (first sub-column positions) within four neighboring capacitor banks, to generate the analog processed signal A17. The operations associated with the other analog processed signals are similar and not detailed for brevity.

Equivalently, for generating an analog processed signal at an odd column and an odd row, the pixel pre-processing circuit 110 may select and determine four capacitors, respectively disposed at the first sub-column positions within four neighboring capacitor banks. For generating an analog processed signal at an odd column and an even row, the pixel pre-processing circuit 110 may select and determine four capacitors, respectively disposed at the second sub-column positions within four neighboring capacitor banks. For generating an analog processed signal at an even column and an odd row, the pixel pre-processing circuit 110 may select and determine four capacitors, respectively disposed at the third sub-column positions within four neighboring capacitor banks. For generating an analog processed signal at an even column and an even row, the pixel pre-processing circuit 110 may select and determine four capacitors, respectively disposed at the fourth sub-column positions within four neighboring capacitor banks.

In practice, for the selected four capacitors in the different capacitor banks, the pixel pre-processing circuit 110 is arranged to perform the low-pass filter operation by controlling the corresponding first switches becoming conductive (i.e. closed state) to make the top nodes of the selected four capacitors be connected and coupled together so as to make the selected four capacitors be connected in parallel to generate and obtain a corresponding analog processed signal into the ADC 115. For example, the pixel pre-processing circuit 110 can make the four first switches respectively disposed at the first sub-column positions respectively within the four neighboring capacitor banks be conductive, so that the top ends of the corresponding capacitors of the four neighboring capacitor banks are connected and coupled together to generate the analog processed signal A1 which is the resultant signal of the analog pixel signals P1, P2, P9, and P10 processed by the low-pass filter operation. Similarly, the pixel pre-processing circuit 110 can make the four first switches respectively disposed at the second sub-column positions respectively within the four neighboring capacitor banks be conductive, so that the top ends of the corresponding capacitors of the four neighboring capacitor banks are connected and coupled together to generate the analog processed signal A8 which is the resultant signal of the analog pixel signals P9, P10, P17, and P18 processed by the low-pass filter operation. Similarly, the pixel pre-processing circuit 110 can make the four first switches respectively disposed at the third sub-column positions respectively within four neighboring capacitor banks be conductive, so that the top ends of the corresponding capacitors of the four neighboring capacitor banks are connected and coupled together to generate the analog processed signal A2 which is the resultant signal of the analog pixel signals P2, P3, P10, and P11 processed by the low-pass filter operation. Similarly, the pixel pre-processing circuit 110 can make the four first switches respectively disposed the fourth at sub-column positions respectively within four neighboring capacitor banks be conductive, so that the top ends of the corresponding capacitors of the four neighboring capacitor banks are connected and coupled together to generate the analog processed signal A9 which is the resultant signal of the analog pixel signals P10, P11, P18, and P19 processed by the low-pass filter operation. The operations associated with the other analog processed signals are similar and not detailed for brevity.

By doing so, the pixel pre-processing circuit 110 can perform the low-pass filter operation in the analog domain by using the capacitor banks without performing a digital-domain low-pass filter operation. The circuit size and computation complexity of ADC 115 and digital processing circuit 120 can be significantly saved.

Figure 3:
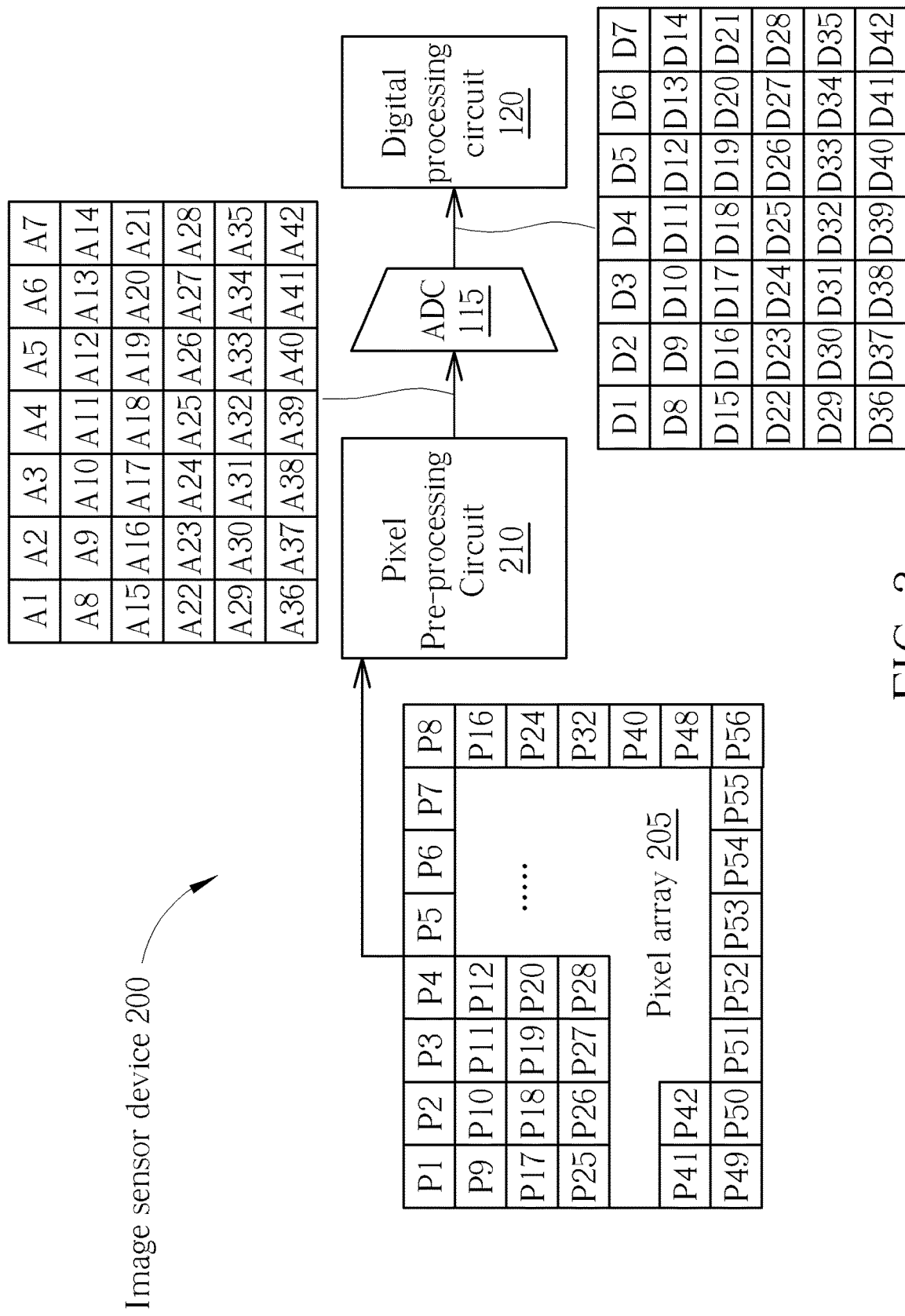
FIG. 3 is a diagram of an image sensor device according to another embodiment of the invention.

FIG. 3 is a diagram of an image sensor device 200 according to another embodiment of the invention. The image sensor device 200 comprises a pixel array 205, a pixel pre-processing circuit 210, the ADC 115, and the digital processing circuit 120. The pixel data is pre-processed before being transmitted into and converted by the ADC 115.

The pixel array 205 for example has a larger size and has a plurality of pixel units such as N×M pixel units arranged in N rows and M columns, e.g. such as 56 pixel units arranged in seven rows and eight columns as shown in FIG. 3 and used to respectively generate a plurality of analog pixel signals P1-P56 in FIG. 3. The pixel array 205 is arranged to output and transmit the pixel data, i.e. the analog pixel signals P1-P56, to the pixel pre-processing circuit 210. The pixel data transmission may be performed serially or in parallel.

The pixel pre-processing circuit 210 is disposed and coupled between the pixel array 205 and ADC 115, and it is used for receiving the analog pixel signals P1-P56, performing low-pass filter operation (s) upon the analog pixel signals P1-P56 in analog domain to generate a plurality of analog processed signals A1-A42 (arranged in six rows and seven columns), wherein the number of analog processed signals A1-A42 is smaller than the number of analog pixel signals P1-P56.

The ADC 115 is disposed and coupled between the pixel pre-processing circuit 210 and the digital processing circuit 120, and it is used for converting the analog processed signals A1-A42 in the analog domain into a plurality of digital processed signals D1-D42 in digital domain, and is used for transmitting the digital processed signals D1-D42 in digital domain into the digital processing circuit 120; the digital processing circuit 120 can perform corresponding digital processing operation (s) upon the digital processed signals D1-D42, and the operations of the digital processing circuit 120 are not detailed for brevity.

Also, an analog processed signal is generated by the low-pass filter operation of the pre-processing circuit 210 in the analog domain based on neighboring/adjacent analog pixel signals. For example, the neighboring/adjacent analog pixel signals may be analog pixel signals of neighboring pixel units arranged in Q rows and R columns, wherein Q is an integer smaller than N and R is an integer smaller than M. For example, the value Q is equal to 2 and the value R is equal to 2, i.e. 2×2 neighboring pixel units.

For example (but not limited), the analog processed signals A1-A42 are equivalently arranged in six rows and seven columns. For a specific analog processed signal at a specific row and at a specific column, the specific analog processed signal is generated by performing a low-pass filter operation in analog domain based on four neighboring pixel signals such as pixel signals of four pixel units, e.g. a pixel unit at the specific row and the specific column, an adjacent pixel unit at the specific row and at a next column, an adjacent pixel unit at a next row and at the specific column, and an adjacent pixel unit at the next row and at the next column.

The descriptions of analog processed signals A1-A21 are described in the previous paragraphs. For the analog processed signal A22 at the fourth row and first column, the analog processed signal A22 is generated by performing the low-pass filter operation in the analog domain based on neighboring analog pixel signals such as four neighboring pixel signals P25, P26, P33, and P34, wherein the pixel signal P25 is at an analog pixel signal at the fourth row and first column generated by the pixel array 205. For the analog processed signal A23 at the fourth row and second column, the analog processed signal A23 is generated by the low-pass filter operation in the analog domain based on four neighboring pixel signals P26, P27, P34, and P35, wherein the pixel signal P26 is at an analog pixel signal at the fourth row and second column generated by the pixel array 205. For the analog processed signal A24 at the fourth row and third column, the analog processed signal A24 is generated by the low-pass filter operation in the analog domain based on four neighboring pixel signals P27, P28, P35, and P36, wherein the pixel signal P27 is at an analog pixel signal at the fourth row and third column generated by the pixel array 205. The descriptions of other analog processed signals A25-A28 at the same row are similar and not detailed for brevity.

Similarly, for the analog processed signal A29 at the fifth row and first column, the analog processed signal A29 is generated by the low-pass filter operation in the analog domain based on neighboring analog pixel signals such as four neighboring pixel signals P33, P34, P41, and P42, wherein the pixel signal P33 is at an analog pixel signal at the fifth row and first column generated by the pixel array 205. For the analog processed signal A30 at the fifth row and second column, the analog processed signal A30 is generated by the low-pass filter operation in the analog domain based on four neighboring pixel signals P34, P35, P42, and P43, wherein the pixel signal P34 is at an analog pixel signal at the fifth row and second column generated by the pixel array 205. For the analog processed signal A31 at the fifth row and third column, the analog processed signal A31 is generated by the low-pass filter operation in the analog domain based on four neighboring pixel signals P35, P36, P43, and P44, wherein the pixel signal P35 is at an analog pixel signal at the fifth row and third column generated by the pixel array 205. The descriptions of other analog processed signals A32-A35 at the same row are similar and not detailed for brevity.

For the analog processed signal A36 at the sixth row and first column, the analog processed signal A36 is generated by the low-pass filter operation in the analog domain based on neighboring analog pixel signals such as four neighboring pixel signals P41, P42, P49, and P50, wherein the pixel signal P41 is at an analog pixel signal at the sixth row and first column generated by the pixel array 205. For the analog processed signal A37 at the sixth row and second column, the analog processed signal A37 is generated by the low-pass filter operation in the analog domain based on four neighboring pixel signals P42, P43, P50, and P51, wherein the pixel signal P42 is at an analog pixel signal at the sixth row and second column generated by the pixel array 205. For the analog processed signal A38 at the sixth row and third column, the analog processed signal A38 is generated by the low-pass filter operation in the analog domain based on four neighboring pixel signals P43, P44, P51, and P52, wherein the pixel signal P43 is at an analog pixel signal at the sixth row and third column generated by the pixel array 205. The descriptions of other analog processed signals A39-A42 at the same row are similar and not detailed for brevity.

Also, the pixel pre-processing circuit 210 is arranged to perform the low-pass filter operation upon four adjacent pixel signals to generate a corresponding analog processed signal which is then processed and converted by the ADC 115 into a corresponding digital processed signal that is to be inputted to the digital processing circuit 120. In practice, for generating a corresponding analog processed signal, the pixel pre-processing circuit 210 may employ four capacitors to respectively store the four adjacent pixel signals and then to make terminals of the four capacitors be coupled together to generate a resultant signal that is equivalent to a signal generated by the low-pass filter operation upon the four adjacent pixel signals.

In one embodiment, the pixel pre-processing circuit 210 may employ N×M capacitor banks to respectively receive and store N×M analog pixel signals, to respectively perform low-pass filter operations upon corresponding Q×R analog neighboring pixel signals to respectively generate Q×R analog processed signals into the ADC 115. One capacitor bank comprises a plurality of capacitors, and each capacitor in one capacitor bank is arranged to receive and store the same pixel signal from the same pixel unit. In one embodiment, the number of capacitor banks of the pixel pre-processing circuit 210 is identical to that of the pixel pre-processing circuit 110. In this embodiment, the capacitors can be reused to store different analog pixel signals; for example, the capacitors at different rows may be reused in a reversed direction (i.e. from bottom to top) to store different analog pixel signals.

Figure 4:
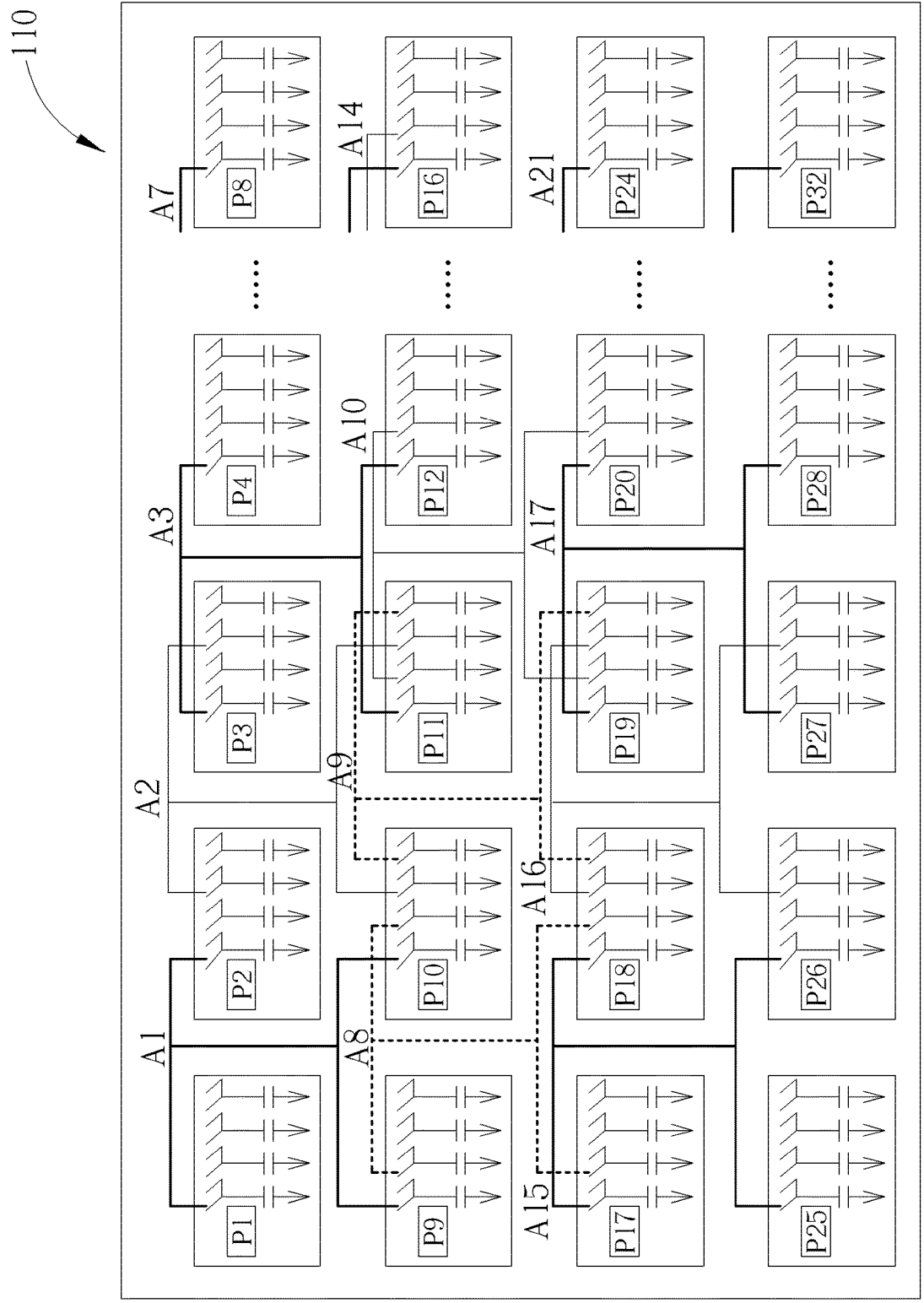
FIG. 4 is a first portion of an operation of an example of the pixel pre-processing circuit in FIG. 3 according to another embodiment of the invention.
Figure 5:
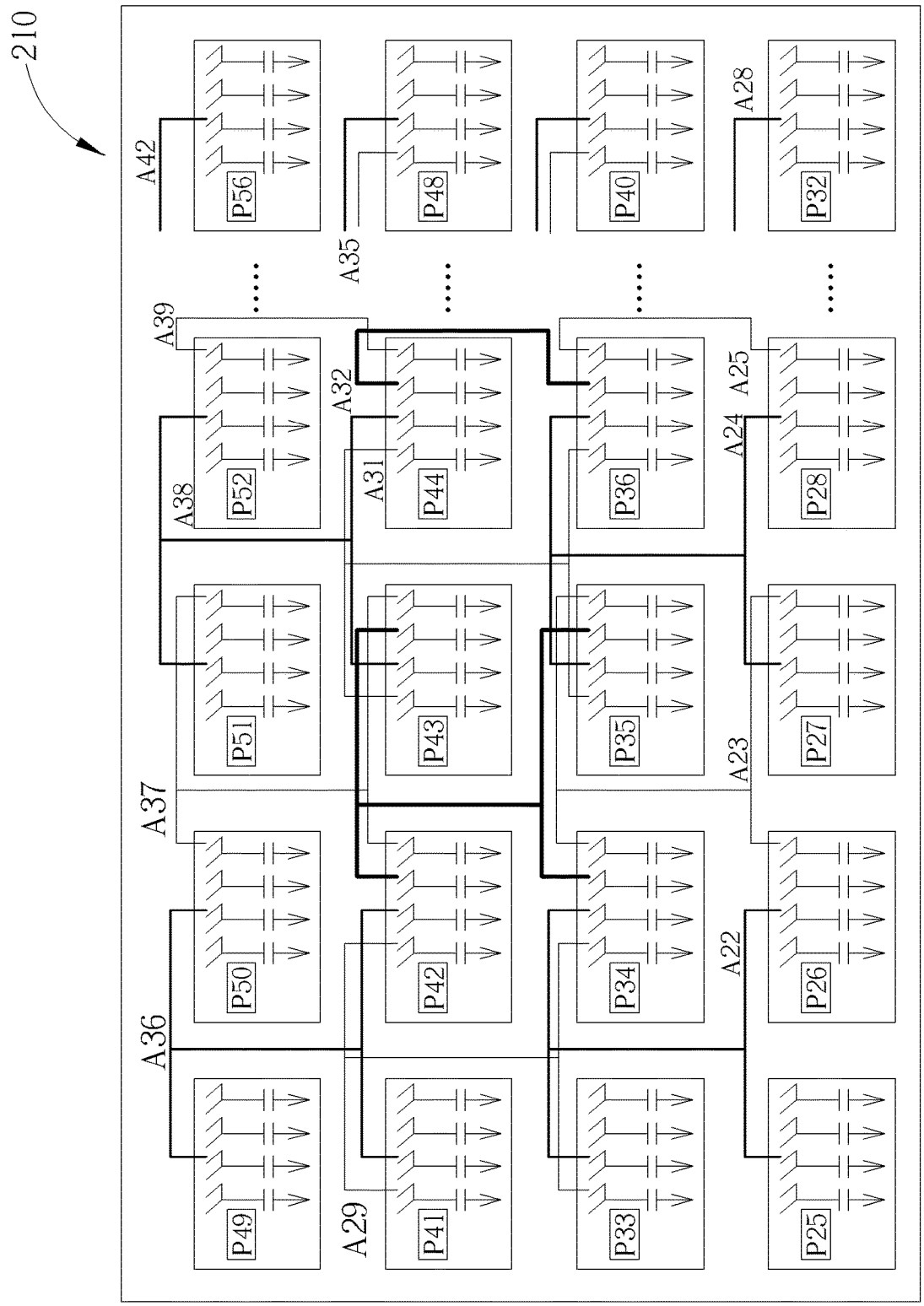
FIG. 5 is a second portion of an operation of an example of the pixel pre-processing circuit in FIG. 3 according to another embodiment of the invention.

Refer to FIG. 4 in conjunction with FIG. 5. FIG. 4 and FIG. 5 are an operation of an example of the pixel pre-processing circuit 210 in FIG. 3 according to another embodiment of the invention. The pixel pre-processing circuit 210 comprises a plurality of capacitor banks arranged in N rows and M columns, wherein the value N is four and the value M is eight, i.e. 4×8=32 capacitor banks, and the 32 capacitor banks are respectively used for receiving and storing the plurality of analog pixel signals P1-P56 respectively from the 56 pixel units of FIG. 3. For generating the analog processed signals A1-A21, the operation of pixel pre-processing circuit 210 is similar to that of pixel pre-processing circuit 110.

In FIG. 4, a capacitor bank comprises a plurality of capacitors such as four capacitors, a plurality of first switches such as eight first switches, and a plurality of second switches such as eight second switches, wherein a corresponding first switch and a corresponding second switch are arranged in parallel. A corresponding capacitor and a corresponding first switch are selectively connected in series, and the corresponding capacitor and a corresponding second switch are selectively connected in series.

To generate an analog processed signal, the pixel pre-processing circuit 210 can select corresponding capacitors respectively disposed at the same spatial positions (i.e. the same sub-column positions) within corresponding capacitor banks, control and conduct the corresponding first switches corresponding to the selected capacitors so as to perform the low-pass filter operation upon the analog pixel signals stored in the selected capacitors to process and generate such analog processed signal. The pixel pre-processing circuit 210 may sequentially select and determine capacitors associated with the analog processed signals to be generated, from top to bottom and from left to right.

For example, at the first, similar to the example in FIG. 2, in FIG. 4, the pixel signals P1-P32 are respectively stored into the capacitors of the 4×8=32 capacitor banks, and the pixel pre-processing circuit 210 is arranged to control the first switches in a forward manner (i.e. from top to bottom) to generate the analog processed signals A1-A21 sequentially. The description is similar and is not detailed for brevity.

When the analog processed signals A1-A21 have been generated and outputted to the ADC 115, all the first switches of all the capacitor banks are open, and in FIG. 5 the pixel signals P25-P56 are respectively stored and overwritten into the capacitors of the 4×8=32 capacitor banks in a reversed manner (from bottom to top); thus, the generated analog processed signals A1-A21 are not affected since the all the first switches are at the open state. The pixel pre-processing circuit 210 is arranged to control the second switches in a reversed manner (i.e. from bottom to top) to generate the analog processed signals A22-A42 sequentially.

For example, in FIG. 5, the pixel signals P25-P32 are again and respectively stored and overwritten into the capacitors of the capacitor banks at the fifth row (i.e. the bottom row), and the pixel signals P33-P40 are respectively stored and overwritten into the capacitors of the capacitor banks at the third row. Then, the pixel signals P41-P48 are respectively stored and overwritten into the capacitors of the capacitor banks at the second row, and then the pixel signals P49-P56 are respectively stored and overwritten into the capacitors of the capacitor banks at the first row (i.e. the top row).

For generating the analog processed signals A22, A29, and A36 at the first column, the pixel pre-processing circuit 210 may select and determine four capacitors, respectively disposed at the second spatial positions (i.e. second sub-column positions) within four neighboring capacitor banks, to generate the analog processed signal A22. The pixel pre-processing circuit 110 may select and determine four capacitors, respectively disposed at the first spatial positions (i.e. first sub-column positions) within four neighboring capacitor banks, to generate the analog processed signal A29. The pixel pre-processing circuit 110 may select and determine four capacitors, respectively disposed at the second spatial positions (i.e. second sub-column positions) within four neighboring capacitor banks, to generate the analog processed signal A36.

Then, for generating the analog processed signals A23, A30, and A37 at the second column, the pixel pre-processing circuit 110 may select and determine four capacitors, respectively disposed at the fourth spatial positions (i.e. fourth sub-column positions) within four neighboring capacitor banks, to generate the analog processed signal A23, so as to avoid using repeated capacitor (s). Then, the pixel pre-processing circuit 110 may select and determine four capacitors, respectively disposed at the third spatial positions (i.e. third sub-column positions) within four neighboring capacitor banks, to generate the analog processed signal A30. The pixel pre-processing circuit 110 may select and determine four capacitors, respectively disposed at the fourth spatial positions (i.e. fourth sub-column positions) within four neighboring capacitor banks, to generate the analog processed signal A37.

Then, for generating the analog processed signals A24, A31, and A38 at the third column, the pixel pre-processing circuit 110 may select and determine four capacitors, respectively disposed at the second spatial positions (i.e. second sub-column positions) within four neighboring capacitor banks, to generate the analog processed signal A24. The pixel pre-processing circuit 110 may select and determine four capacitors, respectively disposed at the first spatial positions (i.e. first sub-column positions) within four neighboring capacitor banks, to generate the analog processed signal A31. The pixel pre-processing circuit 110 may select and determine four capacitors, respectively disposed at the second spatial positions (i.e. second sub-column positions) within four neighboring capacitor banks, to generate the analog processed signal A38. The operations associated with the other analog processed signals are similar and not detailed for brevity.

Equivalently, for the reversed manner, for generating an analog processed signal (e.g. A29 or A31) at an odd column and an odd row, the pixel pre-processing circuit 110 may select and determine four capacitors, respectively disposed at the first sub-column positions within four neighboring capacitor banks. For generating an analog processed signal (e.g. A22 or A24) at an odd column and an even row, the pixel pre-processing circuit 110 may select and determine four capacitors, respectively disposed at the second sub-column positions within four neighboring capacitor banks. For generating an analog processed signal (e.g. A30) at an even column and an odd row, the pixel pre-processing circuit 110 may select and determine four capacitors, respectively disposed at the third sub-column positions within four neighboring capacitor banks. For generating an analog processed signal (e.g. A23 or A37) at an even column and an even row, the pixel pre-processing circuit 110 may select and determine four capacitors, respectively disposed at the fourth sub-column positions within four neighboring capacitor banks.

In practice, for the selected four capacitors in the different capacitor banks, the pixel pre-processing circuit 110 is arranged to perform the low-pass filter operation by controlling the corresponding second switches becoming conductive (i.e. closed state) to make the top nodes of the selected four capacitors be connected and coupled together so as to make the selected four capacitors be connected in parallel to generate and obtain/transmit corresponding analog processed signal into the ADC 115. For example, the pixel pre-processing circuit 110 can make the four second switches respectively disposed at the first sub-column positions respectively within the four neighboring capacitor banks be conductive, so that the top ends of the corresponding capacitors of the four neighboring capacitor banks are connected and coupled together to generate the analog processed signal A29 which is the resultant signal of the analog pixel signals P33, P34, P41, and P42 processed by the low-pass filter operation. The operations associated with the other analog processed signals are similar and not detailed for brevity.

By doing so, the pixel pre-processing circuit 210 can perform the low-pass filter operation in the analog domain by using the capacitor banks without performing a digital-domain low-pass filter operation. The circuit size and computation complexity of ADC 115 and digital processing circuit 120 can be significantly saved. In addition, the size of the capacitor banks of the pixel pre-processing circuit 210 can be configured to be identical to the pixel pre-processing circuit 110 to save circuit areas even though the pixel array may have larger size.

Figure 6:
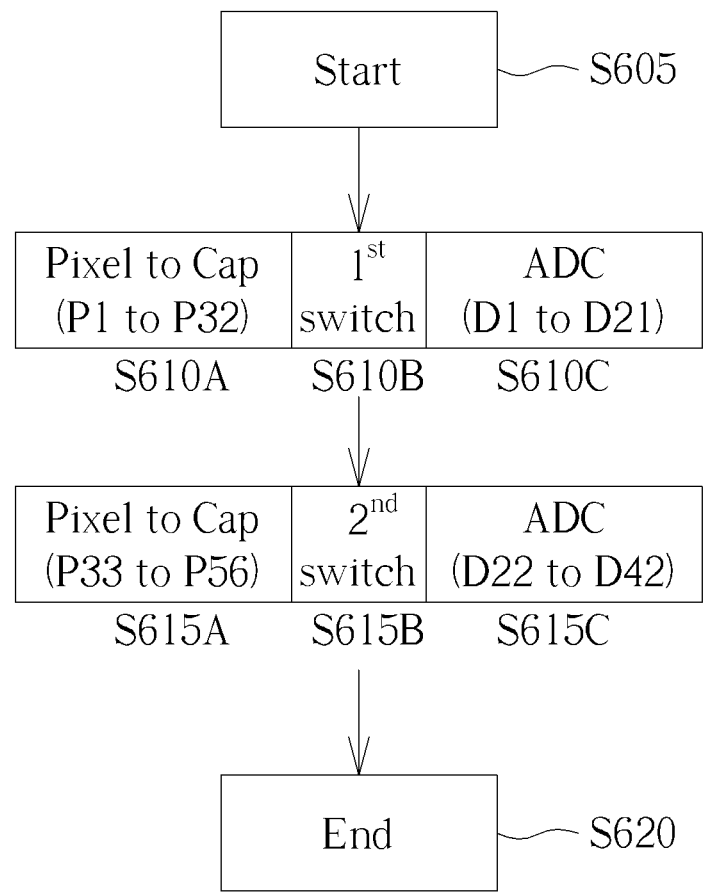
FIG. 6 is a flowchart diagram of the operation of the image sensor device in FIG. 3 according to an embodiment of the invention.

To make readers more clearly understand the embodiments of the invention, FIG. 6 is provided. FIG. 6 is a flowchart diagram of the operation of the image sensor device 200 in FIG. 3 according to an embodiment of the invention. Provided that substantially the same result is achieved, the steps of the flowchart shown in FIG. 6 need not be in the exact order shown and need not be contiguous, that is, other steps can be intermediate. Steps are detailed in the following:

Step S605: Start;

Step S610A: the pixel signals P1-P32 are stored and written respectively into the capacitor banks in a forward manner;

Step S610B: the corresponding first switches are controlled to be closed to generate and obtain the analog processed signal A1-A21;

Step S610C: ADC 115 is used to convert the analog processed signal A1-A21 to generate the digital processed signals D1-D21 into the digital processing circuit 120;

Step S615A: the corresponding first switches are controlled to be open, the pixel signals P25-P32 are stored into the original capacitor banks, and the pixel signals P33-P56 are stored and written respectively into the capacitor banks in a reversed manner;

Step S615B: the corresponding second switches are controlled to be closed to generate and obtain the analog processed signal A22-A42;

Step S615C: ADC 115 is used to convert the analog processed signal A22-A42 to generate the digital processed signals D22-D42 into the digital processing circuit 120; and Step S620: End.

Figure 7:
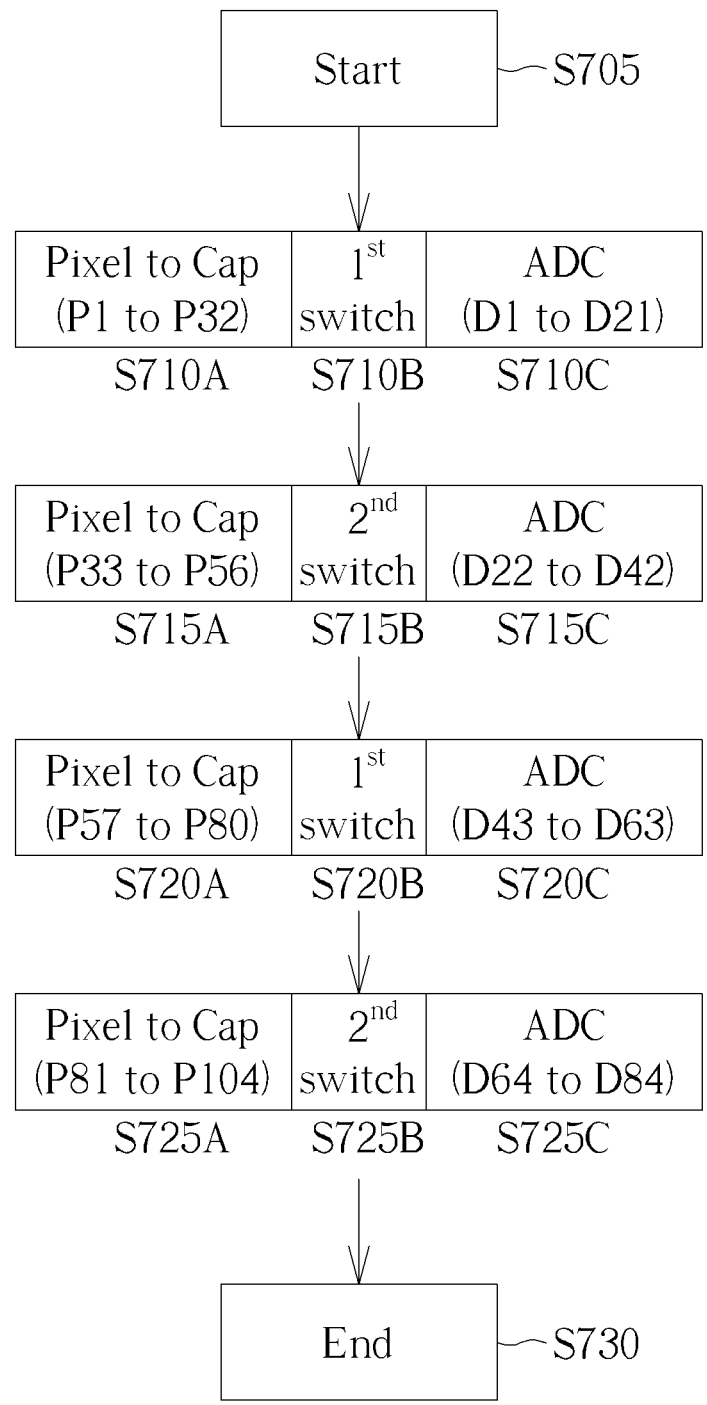
FIG. 7 is a flowchart diagram of the operation of the image sensor device in FIG. 3 according to another embodiment of the invention.

Further, in one, embodiment, the image sensor device 200 in FIG. 3 may support a pixel array having a very large size. The pixel pre-processing circuit 210 can pre-process pixel data in the forward manner and reversed manner for multiple times so as to sequentially process the large-size pixel data. FIG. 7 is a flowchart diagram of the operation of the image sensor device 200 in FIG. 3 according to another embodiment of the invention. Provided that substantially the same result is achieved, the steps of the flowchart shown in FIG. 7 need not be in the exact order shown and need not be contiguous, that is, other steps can be intermediate. Steps are detailed in the following:

Step S705: Start;

Step S710A: the pixel signals P1-P32 are stored and written respectively into the capacitor banks in a forward manner;

Step S710B: the corresponding first switches are controlled to be closed to generate and obtain the analog processed signal A1-A21;

Step S710C: ADC 115 is used to convert the analog processed signal A1-A21 to generate the digital processed signals D1-D21 into the digital processing circuit 120;

Step S715A: the corresponding first switches are controlled to be open, the pixel signals P25-P32 are respectively stored into the original capacitor banks, and the pixel signals P33-P56 are stored and written respectively into the capacitor banks in a reversed manner;

Step S715B: the corresponding second switches are controlled to be closed to generate and obtain the analog processed signal A22-A42;

Step S715C: ADC 115 is used to convert the analog processed signal A22-A42 to generate the digital processed signals D22-D42 into the digital processing circuit 120;

Step S720A: the corresponding second switches are controlled to be open, the pixel signals P49-P56 are respectively stored into the original capacitor banks, and the pixel signals P57-P80 are stored and written respectively into the capacitor banks in a forward manner;

Step S720B: the corresponding first switches are controlled to be closed to generate and obtain the analog processed signal A43-A63;

Step S720C: ADC 115 is used to convert the analog processed signal A43-A63 to generate the digital processed signals D43-D63 into the digital processing circuit 120;

Step S725A: the corresponding first switches are controlled to be open, the pixel signals P73-P80 are respectively stored into the original capacitor banks, and the pixel signals P81-P104 are stored and written respectively into the capacitor banks in a reversed manner;

Step S725B: the corresponding second switches are controlled to be closed to generate and obtain the analog processed signal A64-A84;

Step S725C: ADC 115 is used to convert the analog processed signal A64-A84 to generate the digital processed signals D64-D84 into the digital processing circuit 120; and Step S730: End.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor device, comprising:
a pixel array, having a plurality of pixel units;
a pixel pre-processing circuit, coupled to the pixel array, for receiving a plurality of analog pixel signals respectively from the plurality of pixel units to perform a low-pass filter operation upon the plurality of analog pixel signals in analog domain to generate a plurality of analog processed signals, a number of the plurality of analog processed signals being smaller than a number of the plurality of analog pixel signals; and
an analog-to-digital converter, coupled to the pixel pre-processing circuit, for converting the plurality of analog processed signals in the analog domain into a plurality of digital processed signals in digital domain, and for transmitting the plurality of digital processed signals in digital domain into a digital processing circuit coupled to the analog-to-digital converter;
wherein the pixel pre-processing circuit comprises:
a plurality of capacitor banks arranged in N rows and M columns, respectively for receiving and storing the plurality of analog pixel signals respectively from the plurality of pixel units, and a capacitor bank comprising:
a plurality of capacitors with a plurality of first switches respectively connected in series, respectively for receiving and storing a specific analog pixel signal, the plurality of capacitors being connected in parallel when the first switches are closed; and
a plurality of second switches, arranged with the first switches in parallel;
wherein the capacitors are overwritten by a different analog pixel signal when the second switches are closed and the first switches are open.

2. The image sensor device of claim 1, wherein a number of the plurality of analog pixel signals is equal to N×M, and a number of the plurality of analog processed signals is (N−1)×(M−1); an analog processed signal is generated by the low-pass filter operation in the analog domain based on neighboring analog pixel signals arranged in Q rows and R columns, wherein Q is an integer smaller than N and R is an integer smaller than M.

3. The image sensor device of claim 2,
wherein the analog processed signal is generated based on Q×R different capacitors respectively disposed in neighboring capacitor banks arranged in Q rows and R columns.

4. The image sensor device of claim 3, wherein relative positions of the Q×R different capacitors respectively disposed in the neighboring capacitor banks are identical.

5. The image sensor device of claim 3, wherein the analog processed signal is a resultant signal of the Q×R different capacitors that are connected in series.

6. The image sensor device of claim 1, wherein capacitor banks arranged in two adjacent rows are overwritten by different corresponding analog pixel signals in a reversed manner.

7. The image sensor device of claim 1, wherein the pixel pre-processing circuit is arranged to generate an analog processed signal by performing a weighted averaging upon a portion of the plurality of analog pixel signals.

8. A method of an image sensor device, comprising:
providing a pixel array having a plurality of pixel units;
using a pixel pre-processing circuit for receiving a plurality of analog pixel signals respectively from the plurality of pixel units to perform a low-pass filter operation upon the plurality of analog pixel signals in analog domain to generate a plurality of analog processed signals, a number of the plurality of analog processed signals being smaller than a number of the plurality of analog pixel signals;
using an analog-to-digital converter for converting the plurality of analog processed signals in the analog domain into a plurality of digital processed signals in digital domain; and
transmitting the plurality of digital processed signals in digital domain into a digital processing circuit coupled to the analog-to-digital converter;
wherein the pixel pre-processing circuit comprises:
a plurality of capacitor banks arranged in N rows and M columns, respectively for receiving and storing the plurality of analog pixel signals respectively from the plurality of pixel units, and a capacitor bank comprising:
- a plurality of capacitors with a plurality of first switches respectively connected in series, respectively for receiving and storing a specific analog pixel signal, the plurality of capacitors being connected in parallel when the first switches are closed; and
- a plurality of second switches, arranged with the first switches in parallel; the capacitors are overwritten by a different analog pixel signal when the second switches are closed and the first switches are open.

9. The method of claim 8, wherein a number of the plurality of analog pixel signals is equal to N×M, and a number of the plurality of analog processed signals is (N−1)×(M−1); an analog processed signal is generated by the low-pass filter operation in the analog domain based on neighboring analog pixel signals arranged in Q rows and R columns, wherein Q is an integer smaller than N and R is an integer smaller than M.

10. The method of claim 9,
wherein the analog processed signal is generated based on Q×R different capacitors respectively disposed in neighboring capacitor banks arranged in Q rows and R columns.

11. The method of claim 10, wherein relative positions of the Q×R different capacitors respectively disposed in the neighboring capacitor banks are identical.

12. The method of claim 10, wherein the analog processed signal is a resultant signal of the Q×R different capacitors that are connected in series.

13. The method of claim 8, wherein capacitor banks arranged in two adjacent rows are overwritten by different corresponding analog pixel signals in a reversed manner.

14. The method of claim 8, wherein the pixel preprocessing circuit is arranged to generate an analog processed signal by performing a weighted averaging upon a portion of the plurality of analog pixel signals.

* * * * *